United States Patent [19]

Sato et al.

[11] Patent Number: 5,005,042
[45] Date of Patent: Apr. 2, 1991

[54] ELECTRIC CONTROL CAMERA

[75] Inventors: Osamu Sato; Isamu Hirai, both of Tokyo, Japan

[73] Assignee: Asahi Kogaku Kogyo Kabushiki Kaisha, Tokyo, Japan

[21] Appl. No.: 471,013

[22] Filed: Jan. 25, 1990

Related U.S. Application Data

[63] Continuation of Ser. No. 174,465, Mar. 28, 1988, abandoned.

[30] Foreign Application Priority Data

Mar. 26, 1987 [JP] Japan ................................ 62-72918

[51] Int. Cl.$^5$ ............................................ G03B 7/00
[52] U.S. Cl. .................................. 354/412; 354/413; 354/420
[58] Field of Search ............... 354/412, 413, 416, 417, 354/420, 422, 423, 435, 441, 446, 400, 402

[56] References Cited

U.S. PATENT DOCUMENTS

| | | | |
|---|---|---|---|
| 4,470,684 | 9/1984 | Harvey | 354/413 |
| 4,544,254 | 10/1985 | Egawa et al. | |
| 4,724,455 | 9/1988 | Suzuki et al. | 354/412 |
| 4,763,153 | 8/1988 | Ishimura et al. | 354/400 |
| 4,779,115 | 10/1988 | Fujino et al. | 354/414 |
| 4,779,117 | 10/1988 | Fujino et al. | 354/434 |

FOREIGN PATENT DOCUMENTS 333415 4/1984 Fed. Rep. of Germany .
0036646 2/1987 Japan .

Primary Examiner—Russell E. Adams
Attorney, Agent, or Firm—Sughrue, Mion, Zinn, Macpeak & Seas

[57] ABSTRACT

An electronic control camera in which, when an electronic flash is used with the camera, the required exposure data is automatically set. In the electronic control camera to which the invention pertains, film sensitivity data and luminance data provided by a photometric unit are applied to a data processing unit, which utilizes those tow data values to control the shutter speed and/or the aperture value. Further, the data processing unit varies the shutter speed, the aperture value and/or the amount of light emitted by the electronic flash coupled to the camera in accordance with these two data values.

8 Claims, 4 Drawing Sheets

ELECTRIC CONTROL CAMERA

This is a continuation of application Ser. No. 07/174,465, filed Mar. 28, 1988 now abandoned.

BACKGROUND OF THE INVENTION

The present invention relates to an electronic control camera in which, when an electronic flash is used, the exposure data are automatically set.

In recently developed electronic control cameras, an electronic flash is often combined with a camera. In such a camera, photographing operations can be carried out electrically with the electronic flash, or the operation of the electronic flash automatically controlled by the camera, or the electronic flash is built into the camera. Furthermore, an exclusive electronic flash can be provided so that the camera can be used in various manners. Thus, a variety of electronic flashes differing electrically and mechanically have been developed for use with electronic control cameras.

The amount of light emitted by such an electronic flash is indicated by a value GN (guide number). With the shutter speed set to a certain value or higher, the amount of light emitted is, in general, determined by the product of the aperture value and the illumination distance (or photographing distance). Therefore, if, when the photographing distance is set, the aperture value is determined mechanically in association with the distance set then the correct amount of light emission can be obtained.

In a photographing operation, essential factors for determining exposure data correctly are film sensitivity, shutter speed, aperture value and the object's luminance. In a photographing operation with an electronic flash, it is necessary to add two more factors, electronic flash guide number and photographing distance (distance to the object), to the above-described four factors, and in this case it is especially desirable that the exposure data be selected correctly.

SUMMARY OF THE INVENTION

Accordingly, an object of the invention is to provide an electronic control camera which satisfies the above-described requirements.

For the purpose of achieving the above-described object of the invention, in an electronic control camera in which film sensitivity data provided by film sensitivity data inputting means and object's luminance data provided by photometric means are applied to data processing means and the data processing means utilizes the two pieces of data to control a shutter speed and/or an aperture value, according to a first aspect of the invention, the data processing means varies the shutter speed, the aperture value and/or the amount of light emitted by an electronic flash coupled to the camera according to the two pieces of data.

Furthermore, in the electronic control camera, according to a second aspect of the invention, distance measuring means for measuring the distance to the object is provided with which distance data is applied to the data processing means, and the data processing means varies the shutter speed, the aperture value and/or the amount of light emitted by the electronic flash coupled to the camera according to the film sensitivity data, object's luminance data and distance data.

In addition, in an electronic control camera constructed according to a third aspect of the invention, means for inputting electronic flash guide number data is provided, and the data processing means varies the shutter speed, the aperture value and/or the amount of light emitted by the electronic flash coupled to the camera according to the film sensitivity data, object's luminance data and electronic flash guide number data.

Moreover, in an electronic control camera according to a fourth aspect of the invention, distance measuring means for measuring the distance to the object is provided so that distance data provided by the distance measuring means is applied to the data processing means, means for inputting electronic flash guide number data is provided, and the data processing means varies the shutter speed, the aperture value and/or the amount of light emitted by the electronic flash coupled to the camera according to the film sensitivity data, object's luminance data, distance data and electronic flash guide number data.

DESCRIPTION OF THE PREFERRED EMBODIMENTS

Preferred embodiments of the invention will be described with reference to the accompanying drawings.

Figure 1:
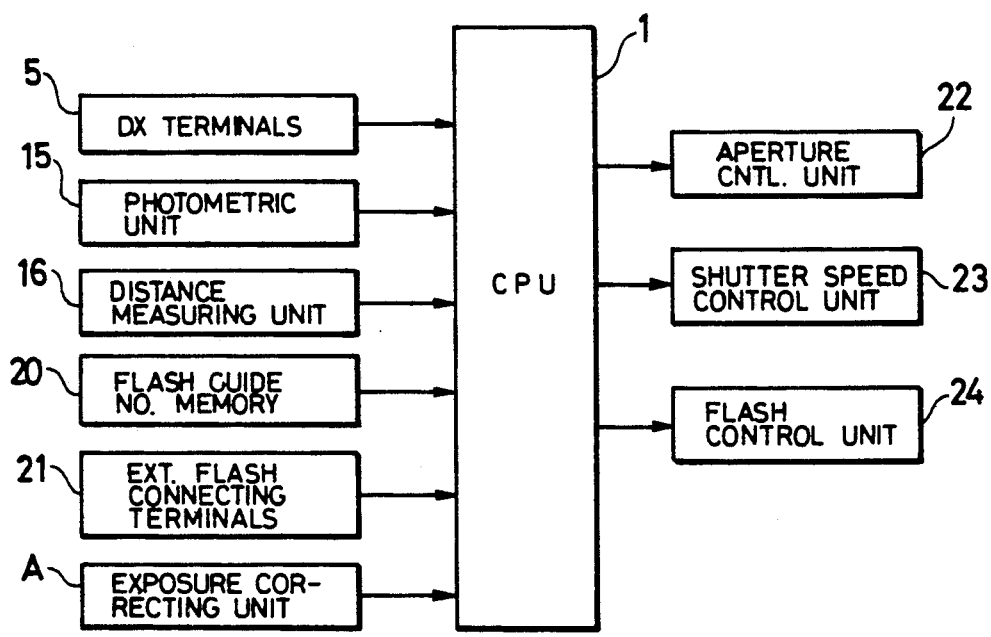
FIG. 1 is a block diagram showing a control circuit in an electronic control camera constructed according to the invention.
Figure 2:
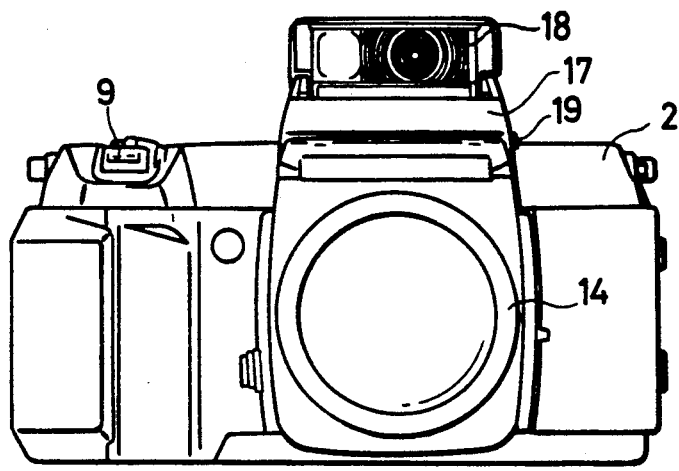
FIG. 2 is a front view of an electronic control camera employing the control circuit shown in FIG. 1.
Figure 3:
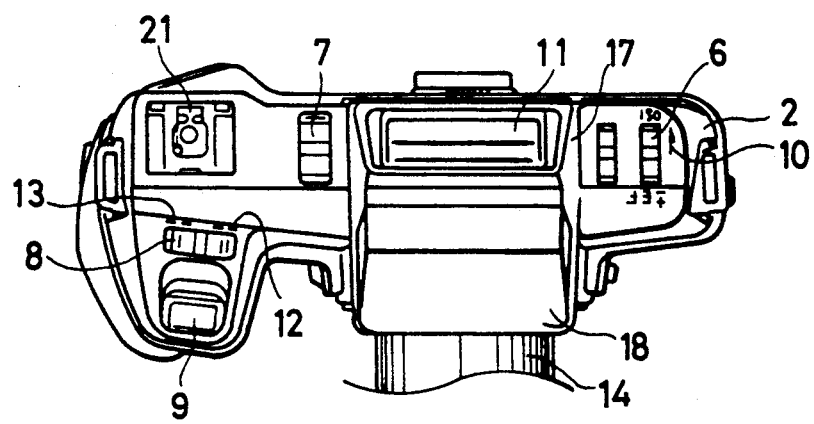
FIG. 3 is a plan view showing a part of the electronic control camera illustrated in FIG. 2.
Figure 4:
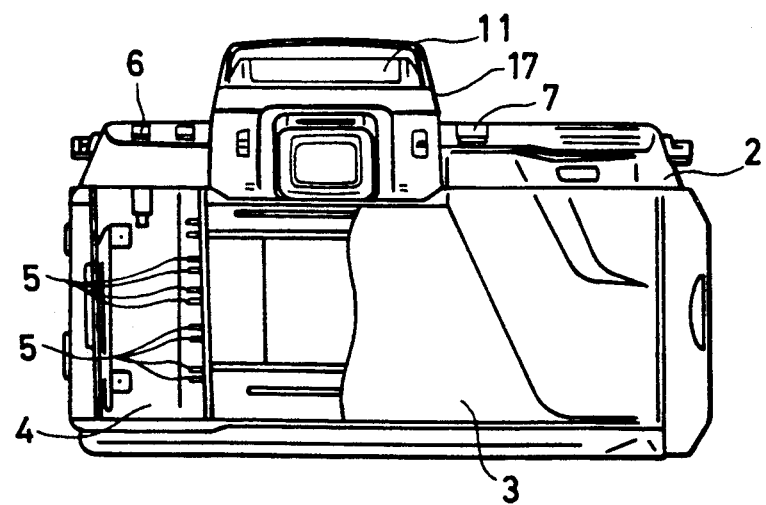
FIG. 4 is a rear view of the electronic control camera of FIG. 2 with the rear cover partially cut away.

A CPU (central processing unit) 1 shown in FIG. 1 is built into a camera body 2 shown in FIGS. 2 through 4.

A film cartridge chamber 4, which is opened and closed with a rear cover 3, is provided on the rear side of the camera body, as shown in FIG. 4. DX terminals 5 protrude, as a film sensitivity data inputting device, into the film cartridge chamber 4 of the camera body 2. When a film cartridge is loaded in the chamber 4, the DX terminals 5 are brought into elastic contact with the DX code region provided on the outer wall of the film cartridge to thus apply the ISO sensitivity (or film sensitivity data) represented by the DX code to the CPU 1.

An ISO/exposure correcting lever 6 is provided on the upper surface of one side portion of the camera body 2 and a main switch 7, a selector lever 8 and a shutter button on the upper surface of the other side portion.

When the shutter button 9 is depressed halfway, a photometric switch (not shown) is turned on. When the shutter button 9 is depressed fully, a release switch (not shown) is turned on.

With the ISO/exposure correcting lever 6 the ISO sensitivity and an exposure correcting value can be changed. That is, when the lever 6 is moved in the direction of the arrow, the ISO value is displayed on a display unit 11 and can be changed. When the lever 6 is moved in the opposite direction, the exposure correcting value can be changed. When, under this condition, the selector lever 8 is moved in the direction of the arrow 12, the exposure correcting value displayed is increased, and the increased value is displayed on the display unit 11. When, on the other hand, the lever 8 is moved in the direction of the arrow 13, the exposure correcting value displayed is decreased, and the decreased value displayed on the display unit. Thus, the ISO/exposure correcting lever 6 and the select lever 8 form an exposure correcting unit A for applying an exposure correcting signal to the CPU 1.

In FIG. 2, reference numeral 14 designates a photographing lens mounted on the camera body 2. A photometric unit 15 is provided in the camera body 2. The photometric unit 15 receives light from an object through the photographing lens 14 to determine the luminance of the object and thus to apply luminance data to the CPU 1. When the photometric switch is turned on with the shutter button 9 depressed halfway, the photometric unit 15 is activated to apply its measurement value to the CPU 1.

A distance measuring unit 16 is provided in the camera body 2. The unit 16 measures the distance between the camera and an object utilizing the amount of extension of the photographing lens 14 and applies the distance data thus determined to the CPU 1. The distance measuring unit 16 may be implemented with a potentiometer provided on the photographing lens 14 or an AF pulser using an encoder.

A viewfinder unit 17 is provided on the top of the middle portion of the camera body 2. A built-in electronic flash 18 of guide number 14 is provided in front of the viewfinder unit 17, and an electronic flash switch 19 is provided on one side of the viewfinder unit 17. The switch 19 is turned on to use the electronic flash. The guide number data of built-in electronic flash 18 is applied to the CPU 1 by a built-in electronic flash guide number memory 20. An external electronic flash connecting terminal 21 is provided, as an external electronic flash guide number inputting device, on the top of the other side of the camera body 2. In the case where the external electronic flash is of the "bounce flash" type, a device for detecting a bounce flash condition may be provided to the external electronic flash so that a signal indicating that state is inputted through the external connecting terminal 21 to the CPU 1. In the case where, on the other hand, the external electronic flash is not of the "bounce flash" type, a switch for inputting the bounce flash condition to the CPU 1 may be provided on the camera body 2 or a detecting device for detecting the bounce flash condition and providing a signal so indicating to the CPU 1 may be provided on the camera body 2. It is not always necessary to input the bounce flash condition to the CPU; however, the embodiment will be described on the premise that a signal indicating the bounce flash condition is applied to the CPU 1.

As described above, the CPU 1 receives film sensitivity data through the DX terminals 5, object luminance data from the photometric unit 15, distance data from the distance measuring unit 16, built-in electronic flash guide number data from the built-in electronic flash guide number data memory 20, external electronic flash guide number data through the external electronic flash connecting terminal 21, and a correcting signal from the exposure correcting unit A. The CPU 1 operates on these data to program-control an aperture control unit 22, a shutter speed control unit 23 and an electronic flash control circuit 24 The electronic flash control circuit 24 controls the quantity of light emitted, the light emission start timing, and the light emission stop timing.

In the case where an external electronic flash larger in guide number than the built-in electronic flash is connected to the connecting terminal 21, the CPU 1 controls the electronic flash control circuit 24 so that only the external electronic flash is operated.

It is assumed that the exposure value (exposure data) is represented by EV, the aperture value (aperture data) by AV, the time value (shutter speed data) by TV, the speed value (film sensitivity data) by SV, the brightness value by BV, the exposure correcting value (exposure correcting data) by XV, the electronic flash guide number by GN, the electronic flash guide number value (guide number data) by GV, the distance value (distance data) by DV, the distance to the object by L, and the aperture value by F. The following equations can then be established:

$$EV = AV + TV = BV + SV + XV \tag{1}$$

$$AV = 2 \log_2 F \tag{2}$$

$$GV = 2 \log_2 GN \tag{3}$$

$$DV = 2 \log_2 L \tag{4}$$

In the case where these data AV, SV, XV, DV and GV are not available, AVs, SVs, XVs, DVs and GVs are employed as initial set values. In this embodiment, the initial set values are as follows, but it should be noted that the invention is not limited thereto or thereby:

AVs = 3

SVs = 5

XVs = 0

DVs = 0

GBs = 7.6

Under the above-described conditions, an example of program control by the CPU 1 will be described with reference to the flowchart in FIG. 5 and the program diagram of FIG. 6.

(1) EV is equal to or smaller than 11

When, with the main switch 7 and the electronic flash switch 19 turned on, the shutter button 9 is depressed halfway, the photometric switch is turned on to activate the photometric unit 15, while the distance to the object is measured by the distance measuring unit 16. The luminance data outputted by the photometric unit 15 and the distance data provided by the distance measuring unit 16 are applied to the CPU 1.

Figure 5:
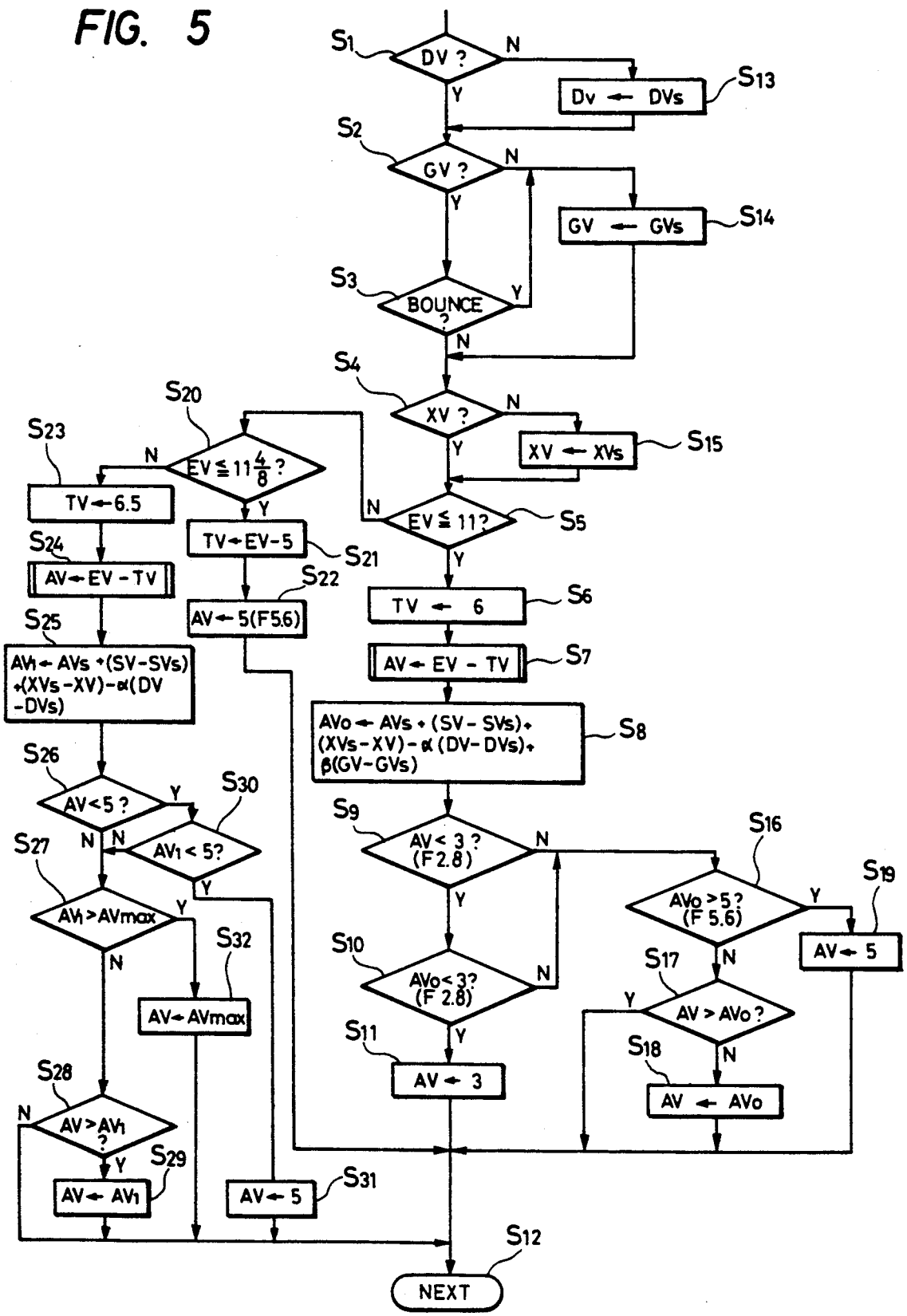
FIG. 5 is a flowchart for a description of a program provided for the electronic control camera shown in FIGS. 1 through 4 which is operated with an electronic flash.

On the other hand, as shown in FIG. 5, in Step S1, the CPU 1 determines whether or not the distance data DS is available. When the distance data DV is available, Step S2 is executed; and if not, Step S13 is effected. In Step S13, DV is replaced by DVs, and the Step S2 is executed again In Step S2, it is determined whether the electronic flash guide number data GV from the external electronic flash is available or not. If GV is available, Step S3 is effected, and if not, Step S14 is performed In Step S3, it is determined whether or not the external electronic flash is ready for bounce light emission If it is ready for bounce light emission, then Step S14 is effected, and if not, Step S4 is effected. In S14, GV is replaced by GVs, and Step S4 is performed.

In Step S4, it is determined whether or not the exposure correcting data XV is available. If the data XV is available, Step S5 is effected, and if not, Step S15 is performed. In Step S15, XV is replaced by XVs, and Step S5 is effected. In the case where no device for inputting the bounce flashing condition to the CPU is available, Step S3 is omitted.

In Step S5, it is determined whether the exposure data EV is equal to or smaller than 11 or not. If the data EV is equal to or smaller than 11, Step S6 is effected, and if it is larger than 11, Step S20 is effected In Step S6, the shutter speed data TV is set to 6, and then Step S7 is performed. In Step S7, the aperture data AV is replaced by the difference (EV−TV) between the data EV and TV, and then Step S8 is carried out. That is, when EV≦11, the CPU 1 activates the shutter control unit 23 so that the shutter speed is set to 1/60 second.

In Step S8, AVo is replaced by AVs+(SV−SVs)+(XVs−XV) −α(DV−DVs)+β(GV−GVs). AVo is an aperture value calculated based on predetermined values of SV, XV, DV, and GV. In the above expression, the α and β are adjustment values for obtaining suitable exposure.

In the case where the exposure correcting data XV is not available, XV is replaced by XVs in Step S15, as described above, and therefore the term (XVs−XV) is zero in the above-described expression. Similarly, in the case where the distance data DV is not available, DV is replaced by DVs in Step S13, and therefore the term α(DV−DVs) is zero in this expression. In the case where the external electronic flash number data GV is not available, GV is replaced by GVs in Step S14, and therefore the term β(GV−GVs) is zero in the expression. With respect to the distance data DV α(DV−DVs) is calculated only when (DV−DVs) is positive and when (DV−DVs) is negative, the term α(DV−DVs) is set to zero. With respect to the guide number data GV, the calculation is carried out only when (GV−GVs) is positive, and when (GV−GVs) is negative, the term β(GV−GVs) is set to zero.

Figure 6:
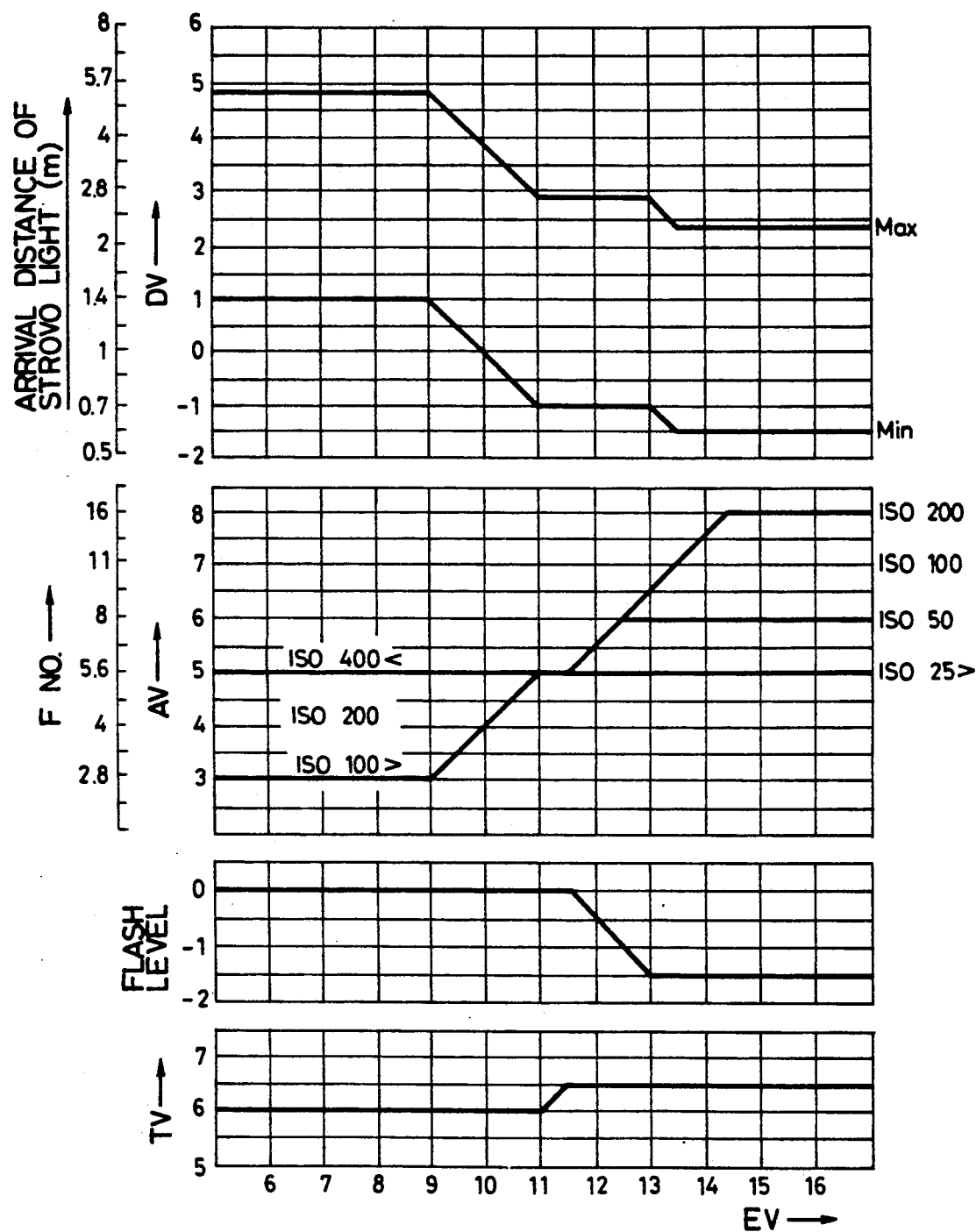
FIG. 6 is a program diagram of various pieces of data required for the photographing operation of the camera with the electronic flash.

When the terms α(DV−DVs), β(GV−GVs) and (XVs−XV) are zero, then only AVs+(SV−SVs) remains, and therefore the program diagram of FIG. 6 depends on the ISO sensitivity only. For instance, in the case where an ISO 100 film cartridge has been loaded in the film cartridge chamber 4 in the EV−AV program diagram of FIG. 6 when EV is equal to or smaller than 9, the lower limit of AV is 3, and when EV is equal to or larger than 13.5, the upper limit of AV is 7. When, under this condition, an ISO 200 film cartridge is loaded in the film cartridge chamber 4 in FIG. 6 the lower limit of AV is shifted to 4 with EV≦10, and the upper limit of AV is shifted to 8 with EV≧14.5.

After the above-described operations have been achieved, Step S9 is effected.

In Step S9, it is determined whether or not AV is smaller than 3 (F2.8). When AV is smaller than 3, Step S10 is effected, and if it is larger than or equal to 3 Step S16 is effected. In Step S10, it is determined whether or not AVo of Step S8 is smaller than 3 (F2.8). If AVo is smaller than 3 then Step S11 is effected, and if it is larger than or equal to 3, Step S16 is effected.

In Step S11 following Step S10, AV is replaced by the shift reference value 3. As a result, the CPU 1 activates the aperture control unit 22 so that the aperture value is set to F2.8. Thereafter Step S12 is carried out.

In Step S16 following Step S9 or S10, it is determined whether or not AVo is larger than 5. If AVo is larger than 5, Step S19 is effected; and if not (AVo≦5), Step S17 is performed In Step S19, AV is set to 5, as a result of which CPU 1 activates the aperture control unit 22 so that the aperture value is set to F5.6.

In Step S17, it is determined whether or not AV is larger than AVo. When AV is larger than AVo Step S12 is effected, and when AV is not larger than AVo (AV≦AVo), then Step S18 is effected. In Step S18, AV is replaced by AVo. In this case, the CPU 1 operates the aperture control unit 22 so that the aperture value is set in the following range:

$$2.8 < F < 5.6 \tag{a}$$

(2) EV is larger than 11

When it is determined that EV is larger than 11, Step S20 is effected. In Step S20, it is determined whether or not EV is equal to or larger than 11 4/8 (=11.5). If EV is larger than 11.5, Step S23 is executed, and if is equal to or smaller than 11.5, Step S21 is effected.

$$11 \leq Ev \leq 11.5 \tag{a}$$

In Step S21, TV is replaced by (EV−5), and then Step S22 is effected. In Step S21, the CPU 1 operates the shutter speed control unit 23 according to EV−5 (in a range of 6<TV<6.5) so that the shutter speed T is set in the following range:

$$1/60 \text{ sec.} < T < 1/100 \text{ sec.}$$

In Step S22, AV is replaced by 5 (F5.6), and then Step S12 is effected. In Step S22, the CPU operates the aperture control unit 22 so that the aperture value is set to F5.6.

$$EV > 11.5 \tag{b}$$

In Step S23 following Step S20, TV is replaced by 6.5, and the CPU 1 activates the shutter speed control unit 23 so that the shutter speed is set to 1/100 second, whereupon Step S24 is executed. In Step S24, AV is replaced by (EV−TV), and then Step S25 is effected.

In Step S25, $AV_1$ is replaced by AVsl+(SV−SVs)+(XVs −XV)−α(DV−DVs) where the α is an adjustment value for obtaining suitable exposure, and then step S26 is carried out. If the exposure correcting data XV is not available, the term (XVs−XV) is zero in the above-described expression because XV has been replaced by SVs in Step S15. If the distance data DV is not available, the term (DV−DVs) is zero because DV has been replaced by DVs in Step S13. With respect to the distance data DV, α(DV−DVs) is calculated only when (DV−DVs) is positive, and the term α(DV−DVs) is set to zero when (DV−DVs) is negative.

When the terms α(DV−DVs) and (XVs−XV) are zero, only AVs+(SV−SVs) remains in the above expression. In this case, similarly to the case of Step S8, the program diagram of FIG. 6 depends on the ISO sensitivity only. For instance, in the case where in ISO 100 film cartridge has been loaded in the film cartridge chamber 4, in the EV−AV program diagram, the lower limit of AV is 3 when EV is equal to or smaller than 9, and the upper limit of AV is 7 when EV is equal to or larger than 13.5. When, under this condition, the ISO 100 film cartridge is replaced by an ISO 200 film cartridge, then in FIG. 6 the lower limit of AV is shifted to 4 when EV is equal to or smaller than 10, and the upper limit of AV is shifted to 8 when EV is equal to or larger than 14.5.

In Step S26, it is determined whether or not AV is smaller than 5. If AV is smaller than 5, then Step S30 is effected, and if not, Step S27 is effected.

In Step S30, it is determined whether or not $AV_1$ is smaller than 5. If $AV_1$ is smaller than 5, Step S31 is executed, and if not, Step S27 is performed. In Step S31 AV is set to 5, and Step S12 is effected. In Step S31, the CPU 1 operates the aperture control unit 22 so that the aperture value is set to F5.6.

In Step 27 following Step S26 or S30, it is determined whether or not $AV_1$ is larger than $AV_{max}$. If $AV_1$ is larger than $AV_{max}$, Step S32 is effected, and if not ($AV_1 \leq AV_{max}$) Step S28 is executed. In Step S32, AV is replaced by $AV_{max}$, and then Step S12 is executed.

That is, the CPU 1 operates the aperture control unit 22 so that the aperture value is set to the minimum value of the photographing lens.

In Step S28, it is determined whether or not AV is larger than $AV_1$. If AV is larger than $AV_1$, Step S29 is effected; and if not ($AV \leq AV_1$), Step S12 is effected. In Step S29, AV is replaced by $AV_1$, and then Step S12 is performed.

(3) The following process

In Step S12 following Step S11, S17, S18, S19, S22, S28, S29 or S31, the CPU is placed in a standby state until the next operation is carried out, that is, until the next operation start signal is received, such as the signal which is provided when the shutter button 9 is depressed halfway again to perform the same process or the signal which is produced when the shutter button 9 is depressed fully to execute the next program.

When the shutter button 9 is depressed fully for execution of the next program, the CPU 1 controls the electronic flash control circuit 24 so that, when EV is equal to or smaller than 11.5, the light emission level of the electronic flash is set to the maximum value (0 level); when EV is equal to or larger than 13, it is set to the −2 level (lower than the 0 level); and when EV is larger than 11.5 but smaller than 13, it is set in a range of 0 to −1.5.

In the above-described embodiment, the film sensitivity data inputted through the DX terminals 5, the object's luminance data provided by the photometric unit 15, the distance data outputted by the distance measuring unit 16, the built-in electronic flash guide number data provided by the built-in electronic flash guide number memory 20, and the external electronic flash guide number data provided through the external electronic flash connecting terminal 21 are utilized to control the operations of the aperture control unit 22, the shutter speed control unit 23 and the electronic flash control circuit 24 according to the pre-established program; however, the invention is not limited thereto or thereby. For instance, the control circuit may be so designed that these data are utilized to control at least one of the control emits 22, 23 and 24.

Furthermore, the control circuit may be designed so that the film sensitivity data and the object's luminance data are utilized to program-control at least one of the control units 22 and 23, and the electronic flash control circuit 24.

In addition, the control circuit may be modified so that the film sensitivity data, the object's luminance data and the distance data are used to program-control at least one of the control units 22 and 23 and the electronic flash control circuit 24.

Moreover, the control circuit may be designed so that the film sensitivity data, the object's luminance data, the distance data and the electronic flash guide number data are utilized to program-control at least one of the control units 22 and 23 and the electronic flash control circuit 24.

As described above, in an electronic control camera in which the film sensitivity data provided by the film sensitivity data inputting unit and the object's luminance data provided by the photometric unit are applied to the data processing unit and the data processing unit utilizes the two pieces of data to control at least one of the shutter speed and aperture value, according to a first aspect of the invention, the data processing unit varies at least one of the shutter speed, aperture value and amount of light emitted by the electronic flash coupled to the camera according to the two pieces of data. Therefore, when the electronic flash is used, the exposure value can be set to a suitably value according to the film sensitivity.

Furthermore, in the electronic control camera according to a second aspect of the invention, a distance measuring unit for measuring the distance to the object is provided and the distance data provided by the distance measurement is applied to the data processing unit, and the data processing unit varies one of the shutter speed, aperture value and amount of light emitted by the electronic flash coupled to the camera according to the film sensitivity data, object's luminance data and distance data. Therefore, when the camera is used with an electronic flash, the exposure value can be set to a suitable value according to the distance to the object.

Furthermore, in an electronic control camera according to a third aspect of the invention, a device for inputting electronic flash guide number data is provided, and the data processing unit varies one of the shutter speed, aperture value and amount of light emitted by the electronic flash coupled to the camera according to the film sensitivity data, object's luminance data and electronic flash guide number data. Therefore, even if, when an electronic flash is used, the electronic flash guide number is changed, the exposure can be suitably achieved.

Furthermore, in an electronic control camera according to a fourth aspect of the invention, a distance measuring unit for measuring the distance to the object is provided and the distance data provided by the distance measuring unit is applied to the data processing unit, a device for inputting electronic flash guide number data is provided, and the data processing unit varies one of the shutter speed, aperture value and amount of light emitted by the electronic flash coupled to the camera according to the film sensitivity data, object's luminance data, distance data and electronic flash guide number data. Therefore, when an electronic flash is used, the exposure can be achieved suitably according to the film sensitivity, distance and electronic flash guide number.

What is claimed is:

1. A camera having a built-in flash comprising:
   (a) film sensitivity data input means (5) for inputting sensitivity data (SV) of a film inserted into said camera;
   (b) shutter means settable in accordance with shutter speed values TV;
   (c) diaphragm aperture means settable in accordance with aperture values AV;
   (d) photometric means (15) for determining the brightness value BV of an object to be photographed by said camera;
   (e) distance setting means for setting distance values DV of the object;
   (f) data processing means (1) connected to said film sensitivity data input means (5) and to said photometric means (15) for calculating an exposure value EV in accordance with said film sensitivity data value SV and with said brightness value BV;
   (g) said data processing means being operable for determining whether said exposure value EV is larger than a first predetermined value, and when said exposure value EV is larger than the first predetermined value, said data processing means varies the amount of light emitted by said flash according to said exposure value EV, flash photographing is carried out with a shutter speed at a first constant value, and an aperture value is calculated according to the following expression:

$$AV = AVs + (SV - SVs) - \alpha(DV - DVs)$$

wherein AVs, SVs and DVs are initially set values for the values AV, SV, and DV, respectively, when not yet available, and wherein $\alpha$ is a coefficient.

2. The camera as defined in claim 1, wherein said aperture value AV is within a range defined by a maximum value and a minimum value.

3. The camera as defined in claim 2, wherein said aperture value AV is kept with the range, and said data processing means is operable to make the aperture value AV equal to the difference (EV − TV) between the exposure value EV and the shutter speed value TV if said difference (EV − TV) is not higher than said aperture value AV, and said data processing means is operable to employ the aperture value AV unchanged if said difference (EV − TV) is higher than said aperture value AV.

4. The camera as defined in claim 3, wherein said aperture value AV is set according to the following expression:

$$AV = AVs + (SV - SVs) + (XVs - SV) - \alpha(DV - DVs)$$

wherein XVs is an initially set value for a correction value XV, when not yet available.

5. The camera as defined in claim 1, wherein, in the case where said exposure value EV is not higher than a first predetermined value, but higher than a second predetermined value, said data processing means varies the amount of light emitted by said flash according to said exposure value EV, flash photographing is carried out with an aperture value AV set to a minimum value of a predetermined range thereof, and a shutter speed value TV set equal to a first value corresponding to the minimum of said exposure value.

6. The camera as defined in claim 1, wherein, in the case where said exposure value EV is not higher than the second predetermined value, said data processing means varies the amount of light emitted by said flash according to said exposure value EV, flash photographing is carried out with an aperture value AV set according to the following expression, and a shutter speed TV is made smaller than said first value, $$AV = AVs + (SV - SVs) - \alpha(DV - DVs) + \beta(GV - GVs)$$

where GVs is an initially set value for a guide number GV, when not yet available and $\beta$ is a coefficient.

7. The camera as defined in claim 6, wherein the aperture value AV is within a range defined by a maximum value and a minimum value.

8. The camera as defined in claim 7, wherein said aperture value AV is kept with the range, and said data processing means is operable to make the aperture value AV equal to the difference (EV − TV) between the exposure value EV and the shutter speed value TV, if said difference (EV − TV) is higher than said aperture value AV, and to employ the aperture value AV unchanged if said difference (EV − TV) is not higher than said aperture value AV.

* * * * *